United States Patent Office 2,968,667
Patented Jan. 17, 1961

2,968,667

BIS(PERFLUOROALKYLMETHYL)SULFITES AND THEIR PREPARATION

Francis E. Lawlor, Wyndmoor, Pa., assignor to Pennsalt Chemicals Corporation, a corporation of Pennsylvania No Drawing. Filed Dec. 10, 1956, Ser. No. 627,140

6 Claims. (Cl. 260—456)

This invention pertains to bis(perfluoroalkylmethyl) sulfites and their preparation. Particularly it pertains to bis(2,2,2-trifluoroethyl) sulfite.

The presence of perfluoroalkyl groups as substituents in the bis(alkyl) sulfite structure of my new compounds gives physical and chemical properties considerably modified as compared to the properties of non-fluorinated bis(alkyl) sulfites. This difference is noticeable when a bis(perfluoroalkylmethyl) sulfite is used, for example, as an additive in a hydrocarbon fuel. Thus, use of the bis(perfluoroalkylmethyl) sulfites as additives in fuels for internal combustion engines is advantageous for improved operating characteristics. Use of a higher bis(perfluoroalkylmethyl) sulfite in lubricants for internal combustion engines is of value in maintaining the component engine parts, particularly in the firing zone, in optimum condition over prolonged periods of operation. Also, bis(2,2,2-trifluoroethyl) sulfite, especially, is a useful fumigant against weevils. Furthermore, the bis(perfluoroalkylmethyl) sulfites of my invention are bacteriostatic in activity.

The bis(perfluoroalkylmethyl) sulfites of this invention are compounds having the structural formula $$(R_fCH_2O)_2SO$$

in which $R_f$ is a perfluoroalkyl group with 1 to 12 carbon atoms. A preferred compound of the series is bis(2,2,2-trifluoroethyl) sulfite.

The novel compounds of my invention are prepared by reacting a perfluoroalkylmethanol having the structural formula $R_fCH_2OH$, in which $R_f$ is a perfluoroalkyl group with from 1 to 12 carbon atoms, with a reactant furnishing the sulfite radical, $=SO$. The sulfite radical is preferably supplied by a thionyl halide selected from the group consisting of thionyl bromide, thionyl chloride and thionyl fluoride, the thionyl chloride being preferred. The sulfite radical may also be formed in situ in the perfluoroalkylmethanol by adding $S_2Cl_2$ and $SO_3$ to the alcohol. The sulfite radical can be supplied also by reacting a perfluoroalkylmethanol with the sulfite ester of a more volatile alcohol. For example, perfluoropropylmethanol is reacted with dimethyl sulfite to form bis(perfluoropropylmethyl) sulfite.

The perfluoroalkylmethanols which may be used to prepare my compounds can be made by methods known in the art and include perfluoromethylmethanol, perfluoroethylmethanol, perfluoropropylmethanol, perfluorobutylmethanol, perfluoropentylmethanol, perfluorohexylmethanol, and other perfluoroalkylmethanols with up to 12 carbon atoms in the $R_f$ group, and including perfluorododecylmethanol.

In carrying out the preparation of my novel compounds, the material furnishing the sulfite radical is added to the perfluoroalkylmethanol at a temperature below the boiling point of the latter compound. The addition may be done batchwise, or preferably, in a continuous manner using equipment commonly used in the art for similar types of reactions and in a manner consistent with established processing precautions and operating procedures. The concentration of reactants may be varied over a wide range. At least a stoichiometrically equivalent amount of reactant materials is required per mole of perfluoroalkylmethanol. For optimum yields an excess of sulfite radical is preferably used.

In a preferred embodiment of this invention 2,2,2-trifluoroethanol is reacted with about a stoichiometrically equivalent amount of thionyl chloride at a temperature in the range from about 10° C. to about 75° C. The bis(2,2,2-trifluoroethyl) sulfite is recovered as a distillate from the reaction mass. The rate of the reaction is governed by the rate at which the heat of reaction can be removed from the reaction equipment. Generally a temperature of about 20 to 30° C. is preferred during the addition of the thionyl chloride to the 2,2,2-trifluoroethanol. The reaction mass is then heated to reflux temperature for the remainder of the reaction period.

The preparation of the compounds of my invention is further illustrated by the following example in which the parts are by weight.

EXAMPLE 1

184 parts of 2,2,2-trifluoroethanol were mixed gradually with 100 parts of thionyl chloride at a temperature in the range from about 20 to 30° C. When the evolution of hydrogen chloride gas began, heat was applied. After all the thionyl chloride had been added, the mass was heated at reflux until evolution of the hydrogen chloride gas ceased. The reaction mass then was transferred to a distillation apparatus and distilled. 91 parts of bis(2,2,2-trifluoroethyl) sulfite were recovered, B.P. 135.5–136.5° C., $n_D^{20}=1.336$.

EXAMPLE 2

The bacteriostatic property of bis(2,2,2-trifluoroethyl) sulfite was determined by the F.D.A. Phenol Coefficient Method described in U.S.D.A. Circular No. 198, pp. 189–196 (1941). Bis(2,2,2-trifluoroethyl) sulfite was found effective at a 1:100 dilution in water in 5 minutes against *Salmonella typhosa*. The phenol standard was effective at a 1:85 dilution in the same test. Bis(2,2,2-trifluoroethyl) sulfite is thus shown to be more effective than the standard.

Following procedures described in the above examples, a material or materials furnishing the sulfite radical, $=SO$, preferably thionyl chloride, may be used to treat a perfluoroalkylmethanol of the group listed in Table 1, below, to prepare the corresponding bis(perfluoroalkylmethyl) sulfite shown in the table.

Table 1

| Perfluoralkylmethanol | Bis(perfluoralkylmethyl) sulfite |
|---|---|
| $C_2F_5CH_2OH$ | $(C_2F_5CH_2O)_2SO$ |
| $C_3F_7CH_2OH$ | $(C_3F_7CH_2O)_2SO$ |
| $C_4F_9CH_2OH$ | $(C_4F_9CH_2O)_2SO$ |
| $C_5F_{11}CH_2OH$ | $(C_5F_{11}CH_2O)_2SO$ |
| $C_6F_{13}CH_2OH$ | $(C_6F_{13}CH_2O)_2SO$ |
| $C_7F_{15}CH_2OH$ | $(C_7F_{15}CH_2O)_2SO$ |
| $C_8F_{17}CH_2OH$ | $(C_8F_{17}CH_2O)_2SO$ |
| $C_9F_{19}CH_2OH$ | $(C_9F_{19}CH_2O)_2SO$ |
| $C_{10}F_{21}CH_2OH$ | $(C_{10}F_{21}CH_2O)_2SO$ |
| $C_{11}F_{23}CH_2OH$ | $(C_{11}F_{23}CH_2O)_2SO$ |
| $C_{12}F_{25}CH_2OH$ | $(C_{12}F_{25}CH_2O)_2SO$ |

Many different embodiments of this invention may be made without departing from the scope and spirit of it, and it is to be understood that my invention includes also such embodiments and is not limited by the above description.

I claim:
1. A bis(perfluoroalkylmethyl) sulfite having the structural formula $(R_fCH_2O)_2SO$ in which $R_f$ is a perfluoroalkyl group with from 1 to 12 carbon atoms.
2. Bis(2,2,2-trifluoroethyl) sulfite.
3. The process for preparing a bis(perfluoroalkylmethyl) sulfite having the structural formula

$$(R_fCH_2O)_2SO$$

in which $R_f$ is a perfluoroalkyl group with from 1 to 12 carbon atoms, which comprises reacting a perfluoroalkylmethanol having the structural formula $R_fCH_2OH$, in which $R_f$ is a perfluoroalkyl group with from 1 to 12 carbon atoms, with a thionyl halide selected from the group consisting of thionyl bromide, thionyl chloride and thionyl fluoride.
4. The process for preparation of bis(2,2,2-trifluoroethyl) sulfite which comprises reacting 2,2,2-trifluoroethanol with a thionyl halide selected from the group consisting of thionyl bromide, thionyl chloride and thionyl fluoride.
5. The process for preparation of bis(2,2,2-trifluoroethyl) sulfite which comprises reacting 2,2,2-trifluoroethanol in about a stoichiometrically equivalent amount with a thionyl halide selected from the group consisting of thionyl bromide, thionyl chloride and thionyl fluoride.
6. The process for preparation of bis(2,2,2-trifluoroethyl) sulfite which comprises reacting 2,2,2-trifluoroethanol in about a stoichiometrically equivalent amount with thionyl chloride at a temperature from about 20° C. to about the boiling point of the reaction mass.

References Cited in the file of this patent
UNITED STATES PATENTS

| | | |
|---|---|---|
| 2,553,721 | Pechukas | May 22, 1951 |
| 2,819,211 | Mikeska et al. | Jan. 7, 1958 |

OTHER REFERENCES

Olah et al.: Chem. Ab., vol. 49, May 1955, pp. 6094–5.
Henne et al.: J.A.C.S. 70, p. 1968 (1948).
Cook: Progress in Organic Chemistry, vol. 2, pp. 59–61 (1953).